H. E. HARPER.
LUMBER PILER.
APPLICATION FILED APR. 12, 1910.

979,293.

Patented Dec. 20, 1910.

WITNESSES:
L. H. Schmidt.
O. E. Tramier

INVENTOR
HAROLD E. HARPER,
BY Munn & Co.
ATTORNEYS

UNITED STATES PATENT OFFICE.

HAROLD E. HARPER, OF ATWOOD, KANSAS.

LUMBER-PILER.

979,293. Specification of Letters Patent. Patented Dec. 20, 1910.

Application filed April 12, 1910. Serial No. 555,019.

*To all whom it may concern:*

Be it known that I, HAROLD E. HARPER, a citizen of the United States, and a resident of Atwood, in the county of Rawlins, State of Kansas, have invented certain new and useful Improvements in Lumber-Pilers, of which the following is a specification.

My invention is an improvement in lumber pilers, and consists in certain novel constructions and combinations of parts hereinafter described and claimed.

The object of the invention is to provide a platform which may be suspended from the end of a stack of lumber, by the lumber, and which is provided with a vertically adjustable roller over which the lumber moves to the stack.

Figure 1:
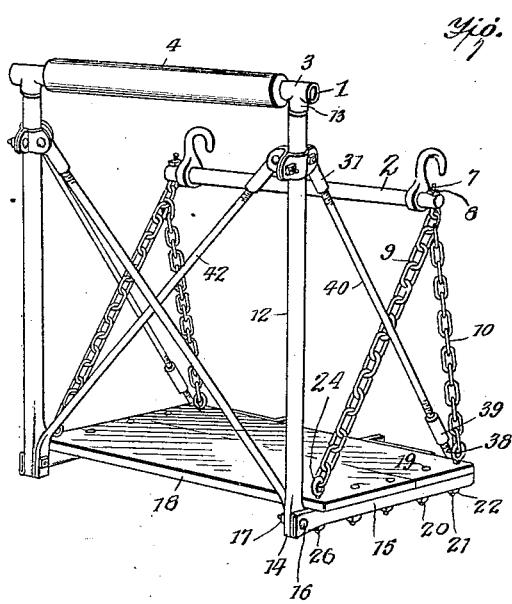
Figure 2:
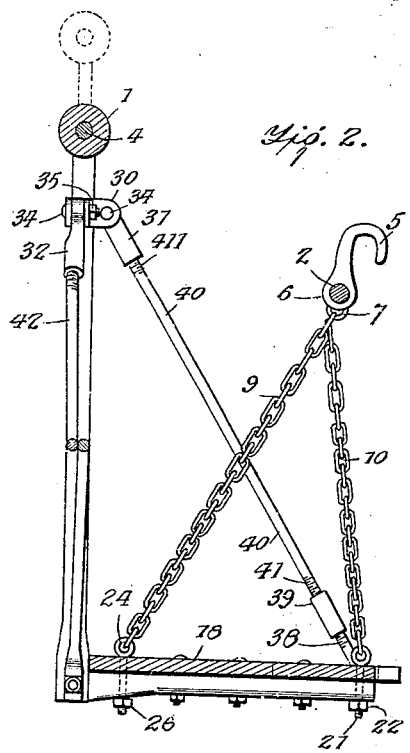
Figure 3:
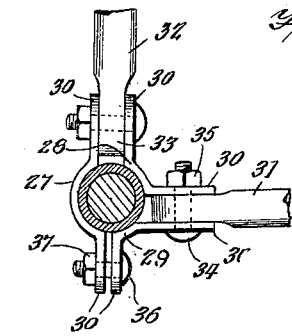
Figure 4:
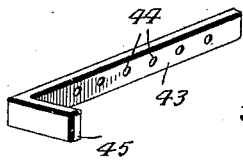

Referring to the drawings forming a part hereof: Figure 1 is a perspective view of the improvement; Fig. 2 is a transverse vertical section; Fig. 3 is an enlarged detail sectional view of the brace connection; and Fig. 4 is a perspective view of one of the brace bars.

The embodiment of the invention shown in the drawings consists of a pair of spaced substantially parallel shafts 1 and 2, one of which, 1, is provided at each end with a tee sleeve 3 threaded thereon, and a roller 4 is journaled on the shaft between the sleeves.

A hook 5 is movably mounted on the shaft 2 near each end, by means of a bearing 6 on the hook, which fits over the shaft. Eye bolts 7 are passed through transverse openings in the ends of the shaft and secured in place by nuts 8, and a plurality of chains 9 and 10 depends from the eye of each bolt.

A hollow shaft or upright 12 is connected with the lateral branch 13 of each of the tee sleeves, and the lower end of each shaft is flattened from side to side to form a lug 14 which is connected to the end of a cross bar 15, by means of a bolt 16 passing through the cross bar and the lug and engaged by a nut 17.

The cross bars 15 are connected by plates or boards 18, which extend from bar to bar, and are secured in place by bolts 19 which pass through the ends of the plates and the cross bars, and are engaged by nuts 20. An eye bolt 21 is passed through the opposite end of each cross bar from the bolt 16 and is held in place by a nut 22, and the chain 10 depending from the adjacent end of the shaft 2 is connected with the eye of the bolt. Another eye bolt 24 is passed through the plates and cross bar near the bolt 16 and held in place by a nut 26, and the chain 9 from the adjacent end of the shaft 2 is connected with the eye of the bolt. A sectional bearing sleeve 27 is secured on each hollow shaft 12 near its upper end, each sleeve consisting of three sections 27, 28 and 29, each of which is provided at its ends with a lateral perforated lug 30.

Internally threaded sockets 31 and 32 are connected with the sleeve, each socket having an ear 33 which is received between adjacent lugs 30 and held in place by a bolt 34 passing through the lugs and the ear and engaged by a nut 35. The other pair of lugs are connected directly by a bolt 36, which is engaged by a nut 37.

A threaded stem 38 is secured to the end of each cross bar 15 adjacent to the eye bolt 21, and an internally threaded sleeve nut 39 engages the stem. A brace rod 40 is provided with a threaded portion 41 at each end, one end engaging the sleeve nut 39 and the other end the adjacent socket 31. The other socket 32 of each sectional bearing is engaged by the threaded end of a brace rod 42, whose opposite end is secured to the opposite shaft 12 by means of the bolt 16 before mentioned, the said rods 42 being arranged in crossed relation. The brace rods 40 may be described as having a turnbuckle interposed in their length, the sleeve nut and its connections being in fact a turnbuckle.

All of the brace rods may be lengthened or shortened by turning the sleeves 39 in the case of the rods 40, and by turning the sockets 32 in the case of the rods 42. When the sockets 32 are turned, they must be disengaged from the lugs 30, by removing the bolt 34. A pair of bars 43 are connected to the edge of the outermost plate on the side of the shaft 2, each bar having a longitudinal series 44 of openings, and an angular portion 45 at one end.

The roller 4 provides a roller bearing for the lumber, which is pushed over the shaft 1, and the height of the roller above the floor formed by the plates 18 may be varied, the lateral branches 13 of the tee sleeves being slidable in the hollow shaft 12, which, however, are only hollow at their upper ends to receive the said lateral branches.

The device is used in the following manner: After the pile of lumber reaches a height such that the operator cannot reach the top, the hooks 5 are engaged with the top of the pile or stack, and the bars 43 are adjusted laterally to bring the angular portions 45 into engagement with the sides of the stack, to prevent lateral swinging movement of the platform.

When so supported and adjusted, the operator standing on the floor receives the lumber as it is passed over the roller 4, and moves it onto the stack. As the stack increases the hooks are moved upwardly, the device moving upward with the increase of the stack. Any looseness may be taken up by the brace rods, and on stacks having a width equal to or greater than the length of the device the bars 43 are not used, the said bars being designed for narrow stacks.

The hooks 5 may be moved laterally and are preferably engaged near the sides of the pile to form a firm support, but far enough inwardly to prevent slipping.

It will be evident that the improvement is, while very strong, easily handled, being in actual use approximately about 4 feet long and 3½ feet wide, that is, of a size to permit one person to stand in it comfortably.

I claim:

1. A device of the character specified, comprising spaced cross bars, plates connecting the cross bars and arranged with their edges abutting, a shaft arranged transversely of the cross bars at each end and above the said bars, hooks mounted for sliding movement on one of the shafts, an eye bolt near each end of each cross bar, an eye bolt near each end of the last named shaft, a chain connecting each of the last named eye bolts with the eye bolts of the adjacent cross bar, a roller on the other shaft, an upright secured to the end of each cross bar adjacent to the roller, a sleeve on each end of the roller shaft, each sleeve having a depending lug, and the upper end of the uprights being recessed to receive the lugs, a bearing near the upper end of each upright, brace rods connecting each bearing with the opposite upright, and with the opposite end of the adjacent cross bar, and means for expanding or contracting said rods.

2. In a device of the character specified, a platform, a shaft at one side thereof and above the platform, a plurality of hooks, each having a bearing slidable on the shaft, a flexible connection between each end of the shaft, and each side of the adjacent end of the platform, an upright at each end of the platform on the opposite side from the hooks, a bearing near the upper end of each upright, brace rods connecting each bearing with the opposite upright and with the opposite side of the platform, means for permitting said rods to be lengthened or shortened, a roller supported between the uprights, means for adjusting said roller vertically, and a pair of bars connected with the side of the platform adjacent to the hooks, said bars being adjustable toward and from each other, and each having an outwardly extending angular portion at the inner end, and a roller journaled between the uprights.

3. In a device of the character specified, a platform, a shaft at one side thereof and above the platform, a plurality of hooks, each having a bearing slidable on the shaft, a flexible connection between each end of the shaft, and each side of the adjacent end of the platform, an upright at each end of the platform on the opposite side from the hooks, brace rods connecting the upper end of each upright with the lower end of the opposite upright, and with the opposite side of the adjacent end of the platform, and a pair of bars adjustably connected with the edge of the platform adjacent to the hooks, each bar having an angular outwardly extending inner end.

4. In a device of the character specified, a platform, a shaft at one side thereof and above the platform, a plurality of hooks, each having a bearing slidable on the shaft, a flexible connection between each end of the shaft, and each side of the adjacent end of the platform, an upright at each end of the platform on the opposite side from the hooks, a roller journaled between the uprights, means for permitting said roller to be adjusted vertically, brace rods connecting the upper end of each upright with the lower end of the opposite upright and with the opposite side of the adjacent end of the platform, and bars adjustably connected with the edge of the platform adjacent to the hooks, each bar having an angular inner end.

5. In a device of the character specified, a platform, a shaft at one side thereof and above the platform, a plurality of hooks, each having a bearing slidable on the shaft, a flexible connection between each end of the shaft, and each side of the adjacent end of the platform, an upright at each end of the platform on the opposite side from the hooks, a roller journaled between the upper ends of the uprights, and means for permitting said roller to be adjusted vertically.

6. In a device of the character specified, a platform, a shaft at one side thereof and above the platform, a plurality of hooks, each having a bearing slidable on the shaft, a flexible connection between each end of the shaft and each side of the adjacent end of the platform, an upright at each end of the platform on the opposite side from the hooks, and a roller journaled between the upper ends of the uprights.

7. In a device of the character specified, a platform, a shaft above the platform at one side, a flexible connection between each end of the shaft and the opposite sides of the platform at the adjacent end, hooks supported by the shaft and movable longitudinally thereof, a pair of spaced uprights at the opposite sides of the platform, a roller journaled between the upper ends of the uprights, means for permitting said roller to be adjusted vertically, and a pair of bars on the edge of the platform adjacent to the hook adjustable toward and from each other, and having angular inner ends.

8. In a device of the character specified, a platform, a shaft above the platform at one side, a flexible connection between each end of the shaft and the opposite sides of the platform at the adjacent end, hooks supported by the shaft and movable longitudinally thereof, a pair of spaced uprights at the opposite side of the platform, a roller journaled between the upper ends of the uprights, and means for permitting said roller to be adjusted vertically.

9. In a device of the character specified, a platform, a shaft above the platform at one side, a flexible connection between each end of the shaft and the opposite sides of the platform at the adjacent end, hooks supported by the shaft and movable longitudinally thereof, a pair of spaced uprights at the opposite side of the platform, and a roller journaled between the upper ends of the uprights.

10. In a device of the character specified, a platform, a shaft above the platform at one side, a connection between the shaft and the platform for supporting the same, hooks movable longitudinally of the shaft, spaced uprights at the opposite side of the platform, and a roller journaled between the upper ends of the uprights.

11. A device of the character specified, comprising a platform, a shaft above the platform at one side thereof, a connection between the shaft and the platform for supporting the same, means on the shaft for engaging the pile of lumber to support the platform, and a roller journaled substantially parallel with the shaft at the opposite side of the platform and at a higher level than the said shaft.

HAROLD E. HARPER.

Witnesses:
   CHAS. W. HARPER,
   FRANK H. WALKER.